United States Patent
Serbanescu (10) Patent No.: US 9,638,531 B2
(45) Date of Patent: May 2, 2017

(54) MAP MATCHING METHODS FOR MOBILE DEVICES

(71) Applicant: TomTom International B.V., Amsterdam (NL)

(72) Inventor: Alexandru Serbanescu, Amstelveen (NL)

(73) Assignee: TomTom Navigation B.V., Amsterdam (NL)

( * ) Notice: Subject to any disclaimer, the term of this patent is extended or adjusted under 35 U.S.C. 154(b) by 7 days.

(21) Appl. No.: 14/440,083

(22) PCT Filed: Nov. 4, 2013

(86) PCT No.: PCT/EP2013/072964
§ 371 (c)(1),
(2) Date: May 1, 2015

(87) PCT Pub. No.: WO2014/068123
PCT Pub. Date: May 8, 2014

(65) Prior Publication Data
US 2015/0316385 A1    Nov. 5, 2015

(30) Foreign Application Priority Data

Nov. 2, 2012  (GB) .................................. 1219799.2

(51) Int. Cl.
*G01C 21/30* (2006.01)
*H04W 64/00* (2009.01)
*G01S 19/13* (2010.01)

(52) U.S. Cl.
CPC .............. *G01C 21/30* (2013.01); *G01S 19/13* (2013.01); *H04W 64/00* (2013.01)

(58) Field of Classification Search
CPC .............................. G01C 21/30; H04W 64/00
See application file for complete search history.

(56) References Cited

U.S. PATENT DOCUMENTS

| | | | |
|---|---|---|---|
| 6,199,001 B1* | 3/2001 | Ohta ................. | B60K 31/0058 701/409 |
| 7,184,882 B2 | 2/2007 | Fukui et al. | |
| 8,386,171 B2 | 2/2013 | Park | |
| 2002/0177935 A1* | 11/2002 | Winner ............. | B60K 31/0008 701/93 |
| 2005/0033507 A1 | 2/2005 | Fukui et al. | |

(Continued)

FOREIGN PATENT DOCUMENTS

| CN | 101688777 A | 3/2010 |
|---|---|---|
| CN | 101743454 A | 6/2010 |
| CN | 102192746 A | 9/2011 |

(Continued)

OTHER PUBLICATIONS

International Search Report issued Feb. 7, 2014 for International Patent Application No. PCT/EP2013/072964.

*Primary Examiner* — Jelani Smith (57) ABSTRACT

A mobile device associated with a road vehicle or the like, has a mapping or navigation functionality configured to determining whether the vehicle is in a forwards or backwards driving mode. When a change of driving mode is detected, the mapping functionality effectively resets so that the transition between driving modes is rendered smoothly and efficiently.

17 Claims, 6 Drawing Sheets

(56) References Cited

U.S. PATENT DOCUMENTS

2010/0241353 A1* 9/2010 Park .................. G01C 21/30
701/532

FOREIGN PATENT DOCUMENTS

| CN | 102663896 A | 9/2012 |
| CN | 102735247 A | 10/2012 |
| WO | 2008140165 A1 | 11/2008 |

* cited by examiner

MAP MATCHING METHODS FOR MOBILE DEVICES

CROSS-REFERENCES TO RELATED APPLICATIONS

This application is the National Stage of International Application No. PCT/EP2013/072964, filed Nov. 4, 2013, and designating the United States, which claims benefit to United Kingdom Patent Application No. 1219799.2 filed Nov. 2, 2012. The entire content of these applications is incorporated herein by reference.

FIELD OF THE INVENTION

This invention relates to mobile devices, and preferably navigation apparatus, systems, and corresponding (computer implemented) methods for displaying the movements of a mobile device on a road network. Illustrative embodiments of the invention relate to portable navigation devices (so-called PNDs); in particular PNDs that include Global Positioning System (GPS) signal reception and processing functionality. In specific embodiments, the mobile device is itself a navigation device associated with a vehicle, e.g. for displaying the location and orientation of the vehicle on a representation of an electronic map, and includes navigation apparatus arranged to carry out such methods. Certain embodiments are also applicable to navigation apparatus that form part of an integrated navigation system, e.g. an in-vehicle navigation system.

BACKGROUND TO THE INVENTION

Portable navigation devices (PNDs) that include GPS (Global Positioning System) signal reception and processing functionality are well known and are widely employed as in-car or other vehicle navigation systems. PNDs of this type may typically be mounted on the dashboard or windscreen of a vehicle, but may also be formed as part of an on-board computer of the vehicle radio or indeed as part of the control system of the vehicle itself. Conventional PNDs have an operation predicated on "forwards driving" in which the heading, i.e. orientation, and measured movement direction of a vehicle are substantially aligned. "Backwards driving", i.e. reverse driving, in which a vehicle is travelling in reverse, typically along a road segment, is not specifically addressed in such navigation devices. One of the main features of a navigation device is to display, in substantially real-time, the movements, e.g. position and heading, of the device (or vehicle, if the device is associated with a vehicle) on a representation of an electronic map, e.g. a graphical representation of the road network. This functionality requires two underlying processes: map "matching" to project a latest received position onto a corresponding position on a navigable segment of the electronic map; and "prediction" to smooth the transition between consecutive received positions.

Applying the "matching" and "prediction" processes of a conventional navigation device (which is configured only for "forward driving" operation) gives rise to complications and potential distractions for the driver. Thus the prediction process and matching process may "cooperate" to represent a reverse driving vehicle movement as oscillating, e.g. appearing to perform one or more sudden U-turn.

There is therefore a need to be able to distinguish between situations where the vehicle is driving in reverse and those where it has performed a genuine U-turn. The data necessary for making such a distinction can be obtained from vehicle sensors. Vehicle sensor data may be conveniently available to navigation devices integrated within the vehicle. Alternative sources of data necessary for identifying reverse driving are available and some of these may be used to detect backwards movement with portable devices, e.g. by processing camera images.

Although some of the problems associated with backwards driving could be solved by maintaining both forwards and backwards road graph expansions at the same time, this is typically not possible given the memory and processing resources available on conventional navigation devices. There is therefore a need for a method for handling "backwards driving", in a more processor-efficient manner.

SUMMARY OF THE INVENTION

According to a first aspect of the present invention there is provided a computer implemented method of displaying the movements of a mobile device on a road network, the road network being represented by an electronic map comprising data indicative of a plurality of segments representing roads of the road network, each segment extending between nodes, the method comprising:

matching at least one received position of the mobile device onto a corresponding position on a segment of the electronic map, the matching further comprising at least determining distance offsets between nodes at least for the segment based on the current movement direction and orientation of the mobile device;

predicting at least one future location of the device from the matched position on the segment; and displaying the movements of the mobile device on a graphical representation of the road network according to the matching and predicting steps, the method further comprising:

monitoring the movement direction and orientation of the mobile device to detect a switch between forwards and backwards driving, and, when the switch is detected, determining new distance offsets between nodes at least for the segment on which the latest received position of the mobile device has been matched based on the current movement direction and orientation of the mobile device.

In the context of the invention, "forwards driving" is when the movement direction of the mobile device is substantially aligned with the orientation of the mobile device, and conversely "backwards driving" is when the movement direction of the mobile device is substantially opposite to the orientation of the mobile device. It will also be appreciated that the switch between forwards and backwards driving can be from forwards driving to backwards driving, or from backwards driving to forwards driving.

As will be appreciated, once a switch has been detected, and at least the distance offsets reset, the map matching and prediction processes will proceed as normal, except applying the relevant driving restrictions for the type of driving. In other words, driving restrictions are not applied in the case of backwards driving.

In embodiments, the at least one received position of the mobile device is determined from signals received from a satellite navigation system. The satellite navigation system may be a global navigation satellite system, such as GPS or GLONASS, or a regional navigation satellite system, such as BeiDou. it is also envisaged that the at least one received position may be determined from signals received from a terrestrial navigation system, e.g. a road-side beacon system or Cell ID based triangulation measurements using the cells of a cellular telecommunications network.

The movement direction of the mobile device is preferably determined from the at least one received position.

The orientation of the mobile device is preferably determined from at least one of: (i) information obtained from one or more inertial sensors; and (ii) the processing of images from an image capture device. For example, a switch between forwards and backwards driving, which may be from forwards to backwards or vice-versa, may be detected by inference from data received from dead reckoning systems. Examples of suitable dead reckoning systems include inertial sensors, such as a compass, accelerometer, gyroscope, etc. Additionally, or alternatively, the switch may be detected by inference from an image processing technique. This technique may be used to detect the switching driving direction if the navigation device contains or is coupled to an image capture device, such as a camera. For example, a feature will increase in size over time in the captured image when driving forward and decrease in size when driving backwards for the case of a forward facing camera. Were the camera backward facing, the reverse will be true; i.e. over time the captured image will decrease in size when driving forward and increase in size when driving backwards.

In embodiments, the matching comprises expanding a road graph around a current matched position on a segment using restrictions appropriate for the current movement direction and orientation of the mobile device. For example, when expanding the road graph for forwards driving, the expansion occurs taking account of driving restriction attributes stored in the electronic map, such as the legal driving direction. Conversely, the legal driving direction is no longer a factor of relevance in backwards driving; indeed in preferred embodiments no driving restrictions are applied when expanding the road graph for backwards driving. Accordingly, in embodiments, when the switch is detected, the road graph is re-expanded using restrictions appropriate for the new movement direction and orientation of the mobile device.

The current expanded road graph is preferably stored in a memory of the mobile device, and is preferably cleared from the memory when the switch is detected except for the segment on which the position of the mobile device has been matched. Thus, the clearing of the memory preferably comprises clearing the currently expanded road graph of all roads except the current road on which the vehicle is located and its mirror (or "reverse road"). This frees the memory to store the newly expanded road graph.

The present invention extends to a device, preferably a navigation device, for carrying out a method in accordance with any of the aspects or embodiments of the invention herein described.

Thus, in accordance with a second aspect of the invention there is provided a mobile device, comprising:

means for receiving at least one position of the mobile device;

means for storing an electronic map comprising data indicative of a plurality of segments representation roads of a road network, each segment extending between nodes;

means for matching at least one received position of the mobile device onto a corresponding position on a segment of the electronic map, the matching further comprising at least determining distance offsets between nodes for the segment based on the current movement direction and orientation of the mobile device;

means for predicting at least one future location of the device from the matched position on the segment;

means for displaying the movements of the mobile device on a graphical representation of the road network according to the matching and predicting steps; and means for monitoring the movement direction and orientation of the mobile device to detect a switch between forwards and backwards driving, and, when the switch is detected, determining new distance offsets between nodes for the segment on which latest received position of the mobile device has been matched based on the current movement direction and orientation of the mobile device.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the system of the present invention in any of its embodiments may be at least one processing device. The or a processing device may be a device of a mobile device, such as a navigation device, whether a PND or an integrated device.

Thus, in accordance with another aspect of the invention there is provided a mobile device, comprising:

a receiver for receiving at least one position of the mobile device;

a memory for storing an electronic map comprising data indicative of a plurality of segments representation roads of a road network, each segment extending between nodes; and at least one processor operatively coupled to the receiver and memory, and arranged to:
  match at least one received position of the mobile device onto a corresponding position on a segment of the electronic map, the matching further comprising at least determining distance offsets between nodes for the segment based on the current movement direction and orientation of the mobile device;
  predict at least one future location of the device from the matched position on the segment using the determined distance offsets; and
  display, on a display screen, the movements of the mobile device on a graphical representation of the road network according to the matching and predicting steps, the at least one processor being further arranged to monitor the movement direction and orientation of the mobile device to detect a switch between forwards and backwards driving, and, when the switch is detected, determine new distance offsets between nodes for the segment on which latest received position of the mobile device has been matched based on the current movement direction and orientation of the mobile device.

Any of the methods in accordance with the present invention may be implemented at least partially using software, e.g. computer programs. The present invention thus also extends to a computer program comprising computer readable instructions executable to perform, or to cause a device, e.g. navigation device, to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE FIGURES

Various embodiments of the present invention will now be described with reference to the accompanying drawings, in which:

FIG. 10A shows the application of the conventional prediction process in a "forwards" driving situation, whereas

DETAILED DESCRIPTION OF THE FIGURES

Portable navigation devices (PNDs) that include GPS (Global Positioning System) signal reception and processing functionality are well known and are widely employed as in-car or other vehicle navigation systems. They may typically be mounted on the dashboard or windscreen of a vehicle, but may also be formed as part of an on-board computer of the vehicle radio or indeed as part of the control system of the vehicle itself.

Figure 1:
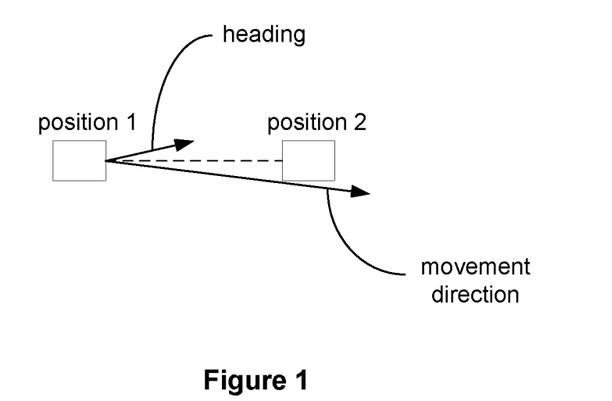
FIG. 1 illustrates a "forwards driving" scenario upon which conventional PND operation is predicated.
Figure 2:
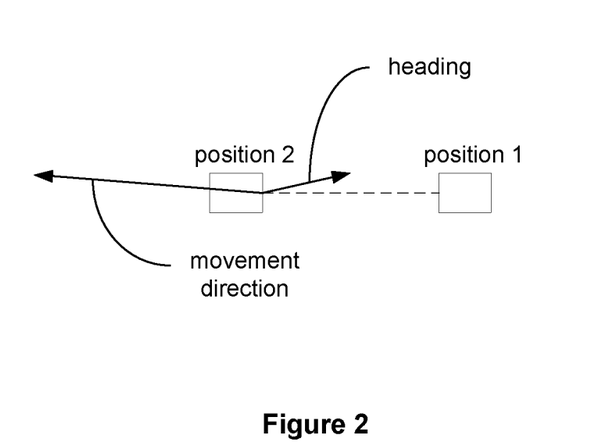
FIG. 2 illustrates a "backwards driving" scenario.

Conventional PNDs have an operation predicated on "forwards driving" in which the heading and measured movement direction of a vehicle are substantially aligned. A "forwards driving" scenario is shown in FIG. 1. It has recently been identified that there is a need to derive a method for handling "backwards driving", i.e. reverse driving, in a processor efficient manner. Backwards driving refers to the situation in which a vehicle is travelling, e.g. along a road segment, in reverse. In other words, where the heading of the vehicle, i.e. indicating its orientation, is substantially opposite to a measured movement direction of the vehicle, i.e. indicating its change in position. A backwards driving scenario is shown in FIG. 2. "Forwards driving" is naturally a more common situation, however a number of situations may arise where it is necessary to put a vehicle into reverse.

Embodiments of the invention provide a method and apparatus for determining location and heading information of a mobile device that accounts for both forwards and backwards driving.

Preferred embodiments of the present invention will now be described with particular reference to a PND. It should be remembered, however, that the teachings of the present invention are not limited to PNDs but are instead universally applicable to any type of computing device, such as a server, computer or mobile processing device that is configured to execute navigation software, i.e. software that shows the position and movement of the device on a visual representation of an electronic map.

In the context of the present application, a navigation device is intended to include (without limitation) any type of mobile navigation device, irrespective of whether that device is embodied as a PND, a navigation device built into a vehicle, or a mobile telephone or portable digital assistant (PDA) executing navigation, and optionally route planning, software.

Figure 3:
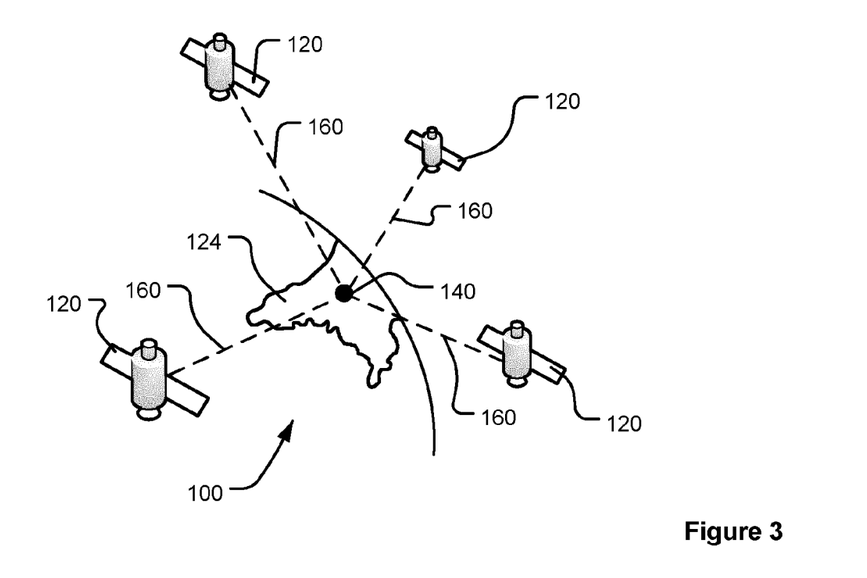
FIG. 3 is a schematic illustration of a Global Positioning System (GPS)

With the above provisos in mind, FIG. 3 illustrates an example view of Global Positioning System (GPS), usable by navigation devices. Clearly the navigation device may utilise global navigation satellite systems (GNSS) other than GPS and/or regional navigation satellite systems (RNSS). GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be, determined with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 3, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

PNDs intended for vehicle navigation are typically mounted on the dashboard or windscreen of a vehicle where they may conveniently be consulted by the driver without impairing the driver's ability to control the vehicle, but may also be formed as part of an on-board computer of the vehicle radio or indeed as part of the control system of the vehicle itself.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route. Nonetheless it is also envisaged that such hand-held devices may also be substantially retained in a substantially fixed position within a vehicle (at least for the duration of a journey) so that the movement (i.e. position and heading) of the device correspond to the vehicle's own movement.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

Figure 4:
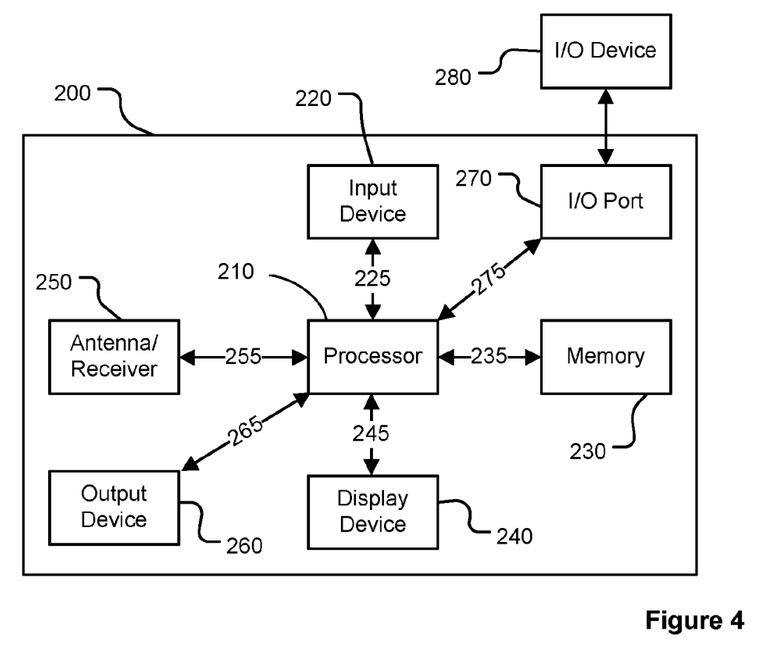
FIG. 4 is a schematic illustration of electronic components arranged to provide a navigation device.

FIG. 4 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 4 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 4 are powered by power sources (not shown) in a conventional manner. As will be understood by one of ordinary skill in the art, different configurations of the components shown in FIG. 4 are considered to be within the scope of the present application. For example, the components shown in FIG. 4 may be in communication with one another via wired and/or wireless connections and the like. Thus, the scope of the navigation device 200 of the present application includes a portable or handheld navigation device 200.

In addition, the portable or handheld navigation device 200 of FIG. 4 can be connected or "docked" in a known manner to a vehicle such as a bicycle, a motorbike, a car, a truck or a boat for example. Such a navigation device 200 is then removable from the docked location for portable or handheld navigation use.

Figure 5:
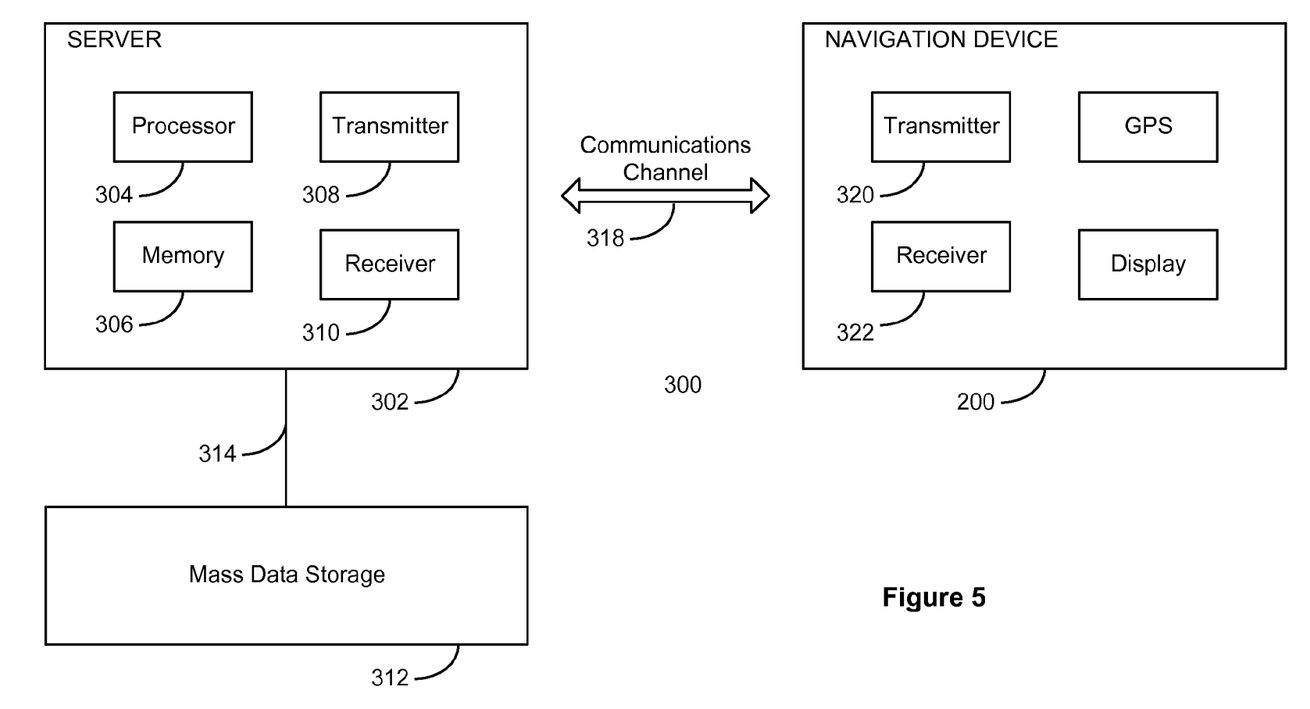
FIG. 5 is a shows a system illustrating the manner in which a navigation device may receive information over a wireless communication channel.

Referring now to FIG. 5, a system 300 is shown illustrating how the navigation device 200 may establish a "mobile" or telecommunications network connection with a server 302 via its own in-built communication system, or via a mobile device (not shown) such as a mobile phone, PDA, and/or any other device with mobile phone technology. The "mobile" network connection may be established via a digital connection, such as via known Bluetooth technology for example. Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internetwork (such as the Internet/World Wide Web) for example, can be done in a known manner. This can include use of TCP/IP layered protocol for example. The mobile device can utilize any number of communication standards such as LTE, HSxPA, UMTS, CDMA, GSM, WiMAX, WAN, etc. As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

In FIG. 5, the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a wireless data connection, a fixed line data connection or a combination of these two categories).

The server 302 includes, in addition to other components which may not be illustrated, a processor 304 operatively coupled to a memory 306 and further operatively coupled, via a wired or wireless connection 314, to a mass data storage device 312. The processor 304 is further operatively coupled to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 4, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the medium for the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 4, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 260, such as audio input/output devices for example.

Figure 6:
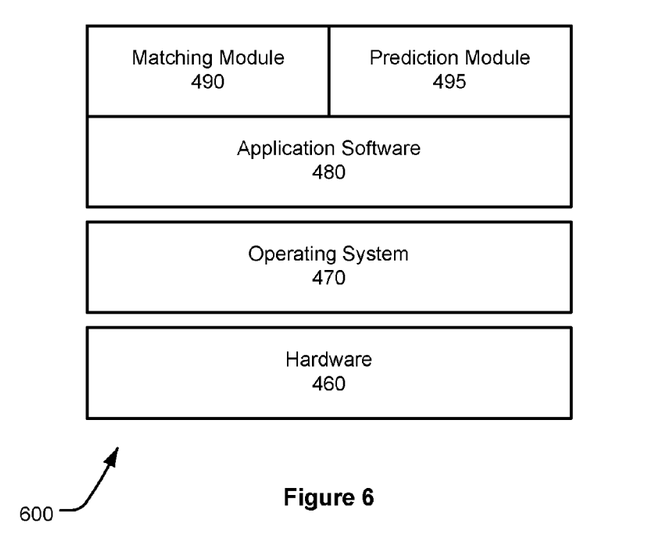
FIG. 6 shows a schematic representation of an architecture employed by a navigation device in accordance with certain embodiments of the present disclosure.

Referring now to FIG. 6 there is illustrated a schematic representation of an architecture 400 employed by the navigation device 200. As will be understood by a person skilled in the art, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

One of the core functions of the navigation device 200 is the determination and display of the movements, e.g. position and heading, of the device (or vehicle, if the device is associated with a vehicle) on a representation of an electronic map, e.g. a graphical representation of the road network. This functionality requires two underlying processes: map "matching" to project a latest received position, e.g. from a GNSS (global navigation satellite system) receiver and/or a dead reckoning system, onto a corresponding position on a navigable segment of the electronic map; and "prediction" to smooth the transition between consecutive received positions.

Respective modules within the application software 480 are responsible for these processes: a matching module 490 (also referred to as a "map matcher"), which uses digital map data to determine a position based that best matches a measured distance offset; and a prediction engine 495, which extrapolates from known matched positions based upon existing parameters such as the last known velocity. These software modules may also be implemented as dedicated hardware circuitry or firmware. The digital map data 500 may be formed from information indicative of arc segments interconnecting nodes, wherein the segments represent a navigable network. Alternatively the map data 500 may be formed by nodes having associated attributes wherein at least some attributes are indicative of connections between nodes having common attributes representing a connection there-between. The connections are indicative of navigable segments in the real world. The navigable segments may be road segments, but may also be segments of any navigable network such as a cycle or footpath network.

Figure 7:
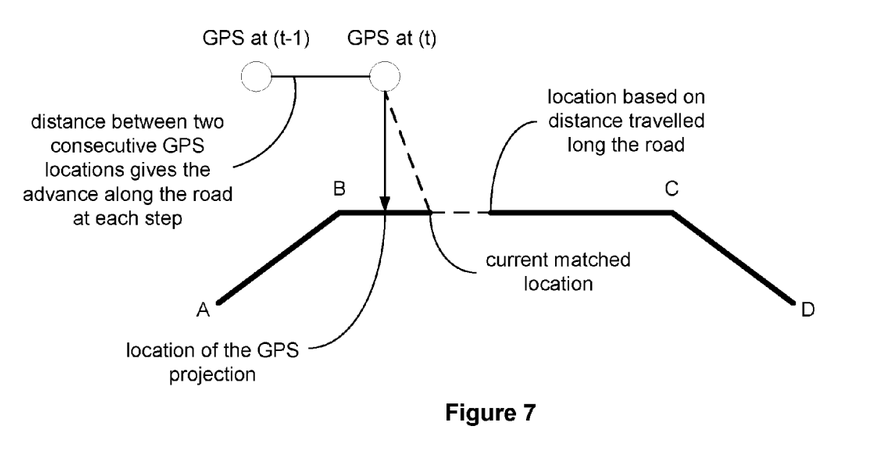
FIG. 7 illustrates conventional matching and prediction processes using successive GPS location measurements.

The matching process is illustrated in FIG. 7, wherein three navigable segments are represented between nodes A, B, C and D, and the position of the vehicle is map matched to a location along the B-C segment.

Since the common driving mode is forward driving, both the matching and the prediction processes are typically configured to operate in a forward direction. Thus, as will be described in more detail below, backwards driving can cause complications in both processes.

As shown in FIG. 7, each received GPS location is matched to a segment of the digital map; a new GPS position being received, for example, every second. However, to enable at least the device's progression along the representation of the electronic map to be rendered in a smooth manner, i.e. without jumping from matched position to matched position, a prediction of the future movements of the device is required to be performed. In other words, predictions are made between successive matched positions. This prediction requires a knowledge of the segment currently being traversed, but also in many situations the upcoming segments that may subsequently be traversed. Thus, the matching and predicting process involves the temporary storage in a memory of the device of an expansion of the navigable network around the device's current position, the expansion including the current segment and any upcoming segments (typically up to a predetermined distance ahead of the current position). This expansion of the navigable network is typically referred to as the "road graph".

Figure 8:
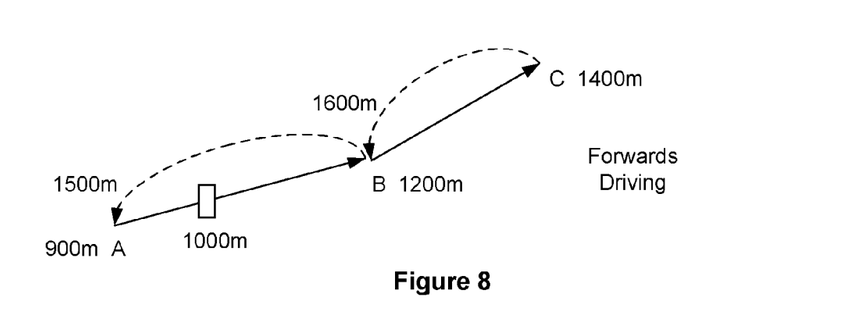
FIG. 8 illustrates a forwards driving situation in a portion of an electronic map and gives exemplary distance offsets based on the driving direction.
Figure 9:
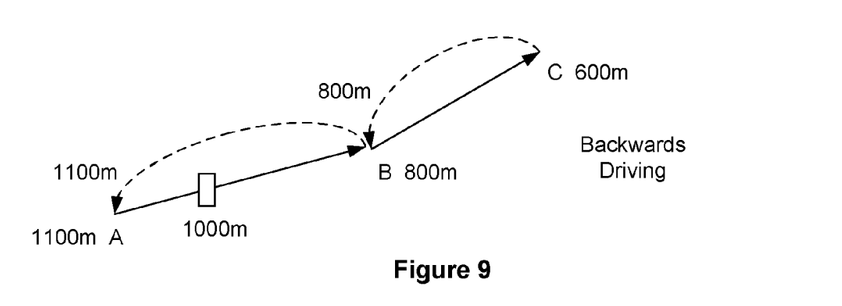
FIG. 9 illustrates a backwards driving situation over the same map segments as in FIG. 8.

The distance travelled along the road network is also an important factor in the matching process and can be used to orient the road graph expansion appropriately. For example, the distance offsets in respect of forward driving are shown in FIG. 8. In this example, a vehicle has driven 1000 m along the road network from an origin (a point, not shown, to the lower left of the Figure). At point B, if reached from point A, the vehicle will have travelled 1200 m. However, if the vehicle has travelled on to point C and then reversed to point B (along the "reverse road" shown by the curved line), the vehicle will have travelled 1600 m—the segment B-C being 200 m in length. The distance offsets for the same network, but in the case of backwards driving, are shown in FIG. 9.

Figure 10A:
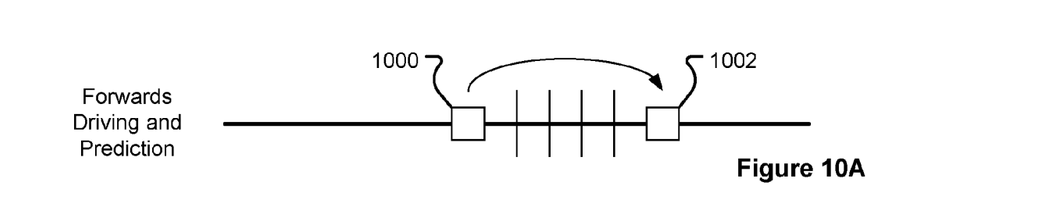

FIG. 10A shows how the prediction process has an in-built assumption that the driving direction is "forwards". Between matching positions (illustrated as small squares, 1000 & 1002) are a number of predicted positions (represented as vertical strokes). Each successive predicted position is "ahead" of the earlier matched position 1000.

Figure 10B:
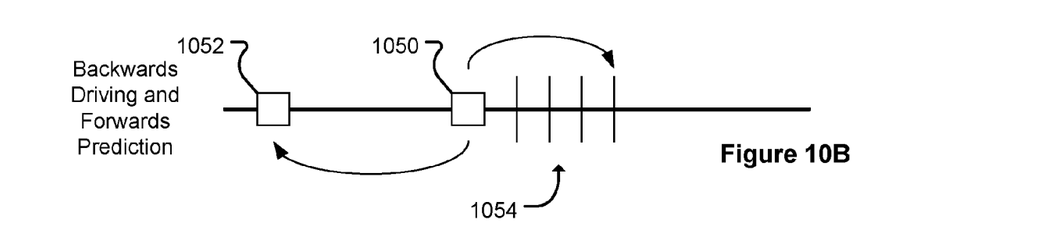
FIG. 10B shows how forwards prediction combines with a backwards driving direction to give rise to an oscillating movement.

It can also be seen from FIG. 10B that, in the prediction process, a forwards prediction combined with a backwards movement would result in an oscillating movement. The backwards movement would eventually give a next matched position 1052 that is "behind" the earlier matched position 1050, whereas the intervening predicted positions 1054 are each "ahead" of the earlier matched position 1050. Thus a screen displaying the matched and predicted positions would advance (using the predicted positions) then suddenly revert to a matching position 1052 "behind" the predicted positions.

Maintaining both forwards and backwards road graph expansions at the same time might be contemplated. However, this is typically not possible given the limited memory and processing resources available on conventional navigation devices.

It has been recognised that an improved method of handling backwards driving during map matching and prediction is required. In particular, it has been recognised that it would be beneficial to treat backwards driving as if it were "forwards driving in the opposite direction" with disabled penalties for illegal driving directions (the legal driving direction no longer being a factor of relevance in backwards driving).

Figure 11:
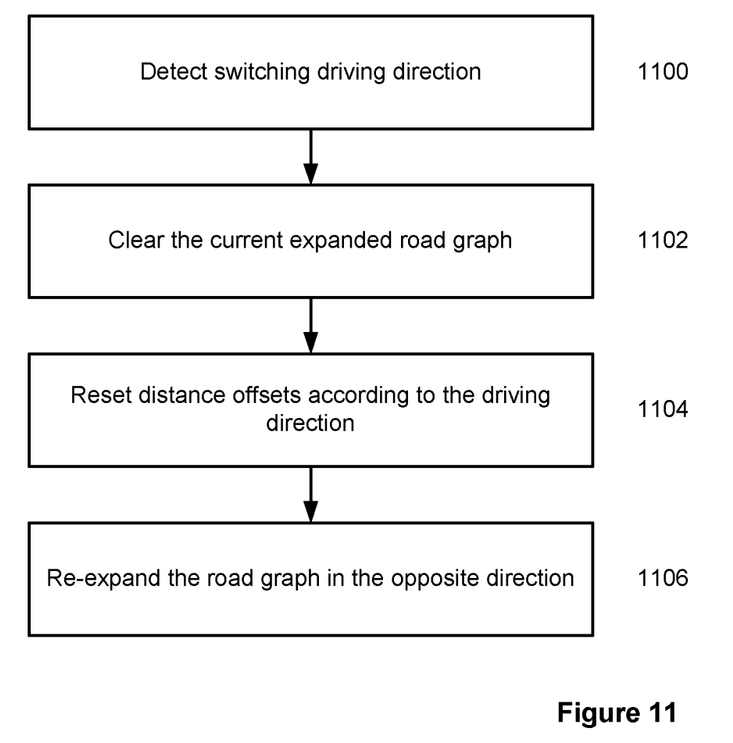
FIG. 11 shows the an exemplary method in accordance with the invention that is performed when a switch is driving direction is detected.

Such a method, according to a preferred embodiment, is depicted in the flow diagram of FIG. 11. Thus, when a switch is driving direction is detected (i.e. from forwards driving to backwards driving, or vice versa)—step 1100, certain embodiments of the present disclosure include the following steps:

clearing the currently expanded road graph (e.g. temporarily stored in a memory of the device) of all roads except the current road on which the vehicle is located and its mirror (or "reverse road")—step 1102;

resetting distance offsets according to the driving direction—step 1104; and re-expanding the road graph in the opposite direction (using the appropriate driving restrictions for the driving mode, i.e. no restrictions for backwards driving)—step 1106.

In these embodiments, the map matching and prediction processes will then proceed in the conventional forward manner, with the exception that driving restrictions are not applied in the case of backwards driving.

Thus in operation the map matcher takes each received GPS position (or other current location data) and matches it to a segment of the electronic map. The prediction engine then uses this matched position and recent travel history to predict the movement of the vehicle until the next GPS position is received. These matched and predicted positions are used by a map renderer to display the moving navigation view on the device.

When a switch in driving direction is detected, the map matcher and prediction engine are effectively reset; this prevents the confusing "oscillation" experienced in conventional devices.

The switch in driving direction can be detected in any number of ways. For example, suitable information may be received from the GNSS receiver, or from dead reckoning systems, e.g. inertial sensors, such as a compass, accelerometer, gyroscope, etc. Suitable image processing techniques could also be used to detect the switching driving direction if the navigation device contains or is coupled to an image capture device, such as a camera. For example, a feature will increase in size in the captured image when driving forward and decrease in size when driving backwards for the case of a forward facing camera, or vice versa for a backward facing camera.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of local or global position sensing technology as an alternative to (or indeed in addition to) GPS. For example, the navigation device may utilise other regional or global navigation satellite systems, such GLONASS, BeiDou or IRNSS. Equally, it is not limited to satellite-based systems, but could readily function using ground-based beacons or other kind of system that enables the device to determine its geographic location such as Cell triangulation in digital cellular telecommunications networks.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A computer implemented method of displaying movements of a mobile device on a road network, the road network being represented by an electronic map comprising data indicative of a plurality of segments representing roads of the road network, each segment extending between nodes, the method comprising:

matching, by a processor, at least one received position of the mobile device onto a corresponding position on a segment of the electronic map, the matching further comprising at least determining distance offsets between nodes at least for the segment based on a current movement direction and orientation of the mobile device;

predicting, by the processor, at least one future location of the mobile device from the matched position on the segment; and displaying, on a display of the mobile device, movements of the mobile device on a graphical representation of the road network, the method further comprising:

monitoring, by the processor, the current movement direction and orientation of the mobile device detecting a switch between forwards and backwards driving, and, when the switch is detected, determining new distance offsets between nodes at least for the segment on which a latest received position of the mobile device has been matched based on the current movement direction and orientation of the mobile device.

2. The method of claim 1, wherein forwards driving is when the current movement direction of the mobile device is substantially aligned with the orientation of the mobile device and backwards driving is when the current movement direction of the mobile device is substantially opposite to the orientation of the mobile device.

3. The method of claim 1, wherein the at least one received position of the mobile device is determined from signals received from a satellite navigation system.

4. The method of claim 1, wherein the movement direction of the mobile device is determined from the at least one received position.

5. The method of claim 1, wherein the orientation of the mobile device is determined from at least one of: (i) information obtained from one or more inertial sensors; and (ii) processing of images from an image capture device.

6. The method of claim 1, wherein the matching comprises expanding a road graph around a current matched position on a segment using restrictions appropriate for the current movement direction and orientation of the mobile device.

7. The method of claim 6, wherein, when the switch is detected, the road graph is re-expanded using restrictions appropriate for a new movement direction and orientation of the mobile device.

8. The method of claim 6, wherein the current expanded road graph is stored in a memory of the mobile device, and wherein the stored road graph is cleared from the memory when the switch is detected except for the segment on which the position of the mobile device has been matched.

9. A mobile device, comprising: a receiver for receiving at least one position of the mobile device; a memory for storing an electronic map comprising data indicative of a plurality of segments representation roads of a road network, each segment extending between nodes; and at least one processor operatively coupled to the receiver and memory, and arranged to:
match at least one received position of the mobile device onto a corresponding position on a segment of the electronic map, the matching further comprising at least determining distance offsets between nodes for the segment based on a current movement direction and orientation of the mobile device;
predict at least one future location of the mobile device from the matched position on the segment; and display, on a display screen, movements of the mobile device on a graphical representation of the road network, the at least one processor being further arranged to monitor the current movement direction and orientation of the mobile device detecting a switch between forwards and backwards driving, and, when the switch is detected, determine new distance offsets between nodes for the segment on which a latest received position of the mobile device has been matched based on the current movement direction and orientation of the mobile device.

10. The mobile device of claim 9, wherein forwards driving is when the movement direction of the mobile device is substantially aligned with the orientation of the mobile device and backwards driving is when the movement direction of the mobile device is substantially opposite to the orientation of the mobile device.

11. The mobile device of claim 9, wherein the at least one received position of the mobile device is determined from signals received from a satellite navigation system.

12. The mobile device of claim 9, wherein the movement direction of the mobile device is determined from the at least one received position.

13. The mobile device of claim 9, wherein the orientation of the mobile device is determined from at least one of: (i) information obtained from one or more inertial sensors; and (ii) processing of images from an image capture device.

14. The mobile device of claim 9, wherein matching comprises means for expanding a road graph around a current matched position on a segment using restrictions appropriate for the current movement direction and orientation of the mobile device.

15. The mobile device of claim 14, wherein, when the switch is detected, the road graph is re-expanded using restrictions appropriate for a new movement direction and orientation of the mobile device.

16. The mobile device of claim 14, wherein the mobile device comprises a memory for storing the current expanded road graph, and the at least one processor is further operable to clear the current expanded road graph from the memory when the switch is detected except for the segment on which the position of the mobile device has been matched.

17. A non-transitory computer readable medium which stores a set of instructions which when executed performs a method of displaying movements of a mobile device on a road network, the road network being represented by an electronic map comprising data indicative of a plurality of segments representing roads of the road network, each segment extending between nodes, the method executed by the set of instructions comprising:
matching at least one received position of the mobile device onto a corresponding position on a segment of the electronic map, the matching further comprising at least determining distance offsets between nodes at least for the segment based on a current movement direction and orientation of the mobile device;
predicting at least one future location of the mobile device from the matched position on the segment; and
displaying, on a display of the mobile device, movements of the mobile device on a graphical representation of the road network, the method further comprising: monitoring the current movement direction and orientation of the mobile device detecting a switch between forwards and backwards driving, and, when the switch is detected, determining new distance offsets between nodes at least for the segment on which a latest received position of the mobile device has been matched based on the current movement direction and orientation of the mobile device.

* * * * *